(12) United States Patent
Esler et al.

(10) Patent No.: US 7,607,697 B2
(45) Date of Patent: Oct. 27, 2009

(54) LOAD CONTROL DEVICE

(75) Inventors: James C. Esler, Noblesville, IN (US); Michael A. Wiseman, Avon, IN (US); James R. Anthony, Noblesville, IN (US); David D. Merrick, Cicero, IN (US); Guy R. Dingman, Lafayette, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 371 days.

(21) Appl. No.: 11/302,933

(22) Filed: Dec. 14, 2005

(65) Prior Publication Data

US 2007/0120001 A1    May 31, 2007

Related U.S. Application Data

(63) Continuation-in-part of application No. PCT/US2004/019290, filed on Jun. 17, 2004.

(60) Provisional application No. 60/479,561, filed on Jun. 18, 2003, provisional application No. 60/527,441, filed on Dec. 4, 2003, provisional application No. 60/648,667, filed on Jan. 31, 2005.

(51) Int. Cl.
*B60R 22/00*   (2006.01)

(52) U.S. Cl. .................... 280/801.1; 280/805; 280/808; 297/468; 24/579.09

(58) Field of Classification Search .............. 280/801.1, 280/801.2, 805, 808; 24/579.09, 579.11; 297/468

See application file for complete search history.

(56) References Cited

U.S. PATENT DOCUMENTS

| | | | | |
|---|---|---|---|---|
| 3,648,954 | A | * | 3/1972 | Gaylord et al. .......... 244/122 B |
| 4,302,049 | A | * | 11/1981 | Simpson ..................... 297/484 |
| 4,738,413 | A | * | 4/1988 | Spinosa et al. .......... 244/151 R |
| 5,074,588 | A | * | 12/1991 | Huspen ................... 280/801.1 |
| 5,432,987 | A | * | 7/1995 | Schroth ....................... 24/632 |
| 5,449,223 | A | * | 9/1995 | Miculici et al. ............. 297/484 |
| 5,603,527 | A | * | 2/1997 | Bee ............................ 280/808 |
| 5,908,223 | A | * | 6/1999 | Miller ........................ 297/484 |
| 5,961,060 | A | | 10/1999 | Brambilla et al. |
| 5,967,442 | A | | 10/1999 | Wier |
| 6,089,662 | A | * | 7/2000 | Lambert et al. ............. 297/238 |
| 6,564,895 | B1 | | 5/2003 | Bohmler |
| 6,719,326 | B2 | * | 4/2004 | Schroth et al. ........... 280/801.1 |
| 7,224,270 | B2 | * | 5/2007 | Patterson et al. ......... 340/457.1 |
| 2007/0182235 | A1 | * | 8/2007 | Fonseca De Arruda et al. .......................... 297/468 |

* cited by examiner

*Primary Examiner*—Toan C To
(74) *Attorney, Agent, or Firm*—Woodard, Emhardt, Moriarty, McNett & Henry LLP

(57) ABSTRACT

A load control device comprises a frame defining a first anchor slot configured to receive a first restraint member, and a second anchor slot configured to receive a second restraint member. At least a portion of the frame yields under a load between the first and second anchor slots that is in excess of a predetermined load.

15 Claims, 12 Drawing Sheets

LOAD CONTROL DEVICE

CROSS-REFERENCE TO RELATED APPLICATIONS

This application is a continuation-in-part of and claims priority to International Application Number PCT/US2004/019290 entitled "Load Control Device" having an international filing date of Jun. 17, 2004, which claims priority to U.S. Provisional Application No. 60/479,561 filed Jun. 18, 2003 and to U.S. Provisional Application No. 60/527,441 filed Dec. 4, 2003. This application also claims the benefit of and priority to U.S. Provisional Patent Application No. 60/648,667, filed Jan. 31, 2005. The disclosures of all three provisional applications and the PCT international application are incorporated herein by reference.

FIELD OF THE INVENTION

The present invention relates generally to a load control device for use with a vehicle restraint system, and more specifically to a load control device for use with any add-on child restraint system, such as for example and without limitation a portable child seat.

BACKGROUND AND SUMMARY

This invention relates to a load control device for use with a vehicle restraint system. Several pertinent references, the disclosures of which are incorporated herein by reference, include U.S. Pat. Nos. 5,961,060; 5,967,442, and 6,564,895.

The present invention comprises one or more of the features identified in the various claims appended to this application and combinations of such features as well as one or more of the following features or combinations thereof. One illustrative load control device comprises a frame or housing, a spool carried by the frame or housing and movable therein, a load limiting member or torsion bar coupled to the spool and fixed against movement relative to the spool, and a stop member coupled to the load limiting member and fixed against movement relative to the load limiting member. The frame or housing defines a cavity having opposing holes or openings through which the spool may be received. The cavity is sized so that the spool may move freely therein. The frame or housing has a longitudinal axis through the center of the cavity. The spool has a central bore formed therethrough. The central bore has a longitudinal axis which is generally aligned with the longitudinal axis of the frame when the spool is received within the frame's cavity. The central bore may be formed in any geometrical shape such as for example and without limitation an ellipse, an oval, a triangle, a square, a rectangle, a parallelogram, a pentagon, a hexagon, an octagon or other suitable shape. At least a portion of the load limiting member is formed and sized to be received within the bore such that the load limiting member and spool are substantially fixed from movement relative to one another. At least a portion of the load limiting bar is formed and sized to couple with the stop member such that the stop member and load limiting member are fixed from movement relative to one another. Thus, when the stop member and the load limiting member are coupled together, and the load limiting member is received within the bore, the stop member, the load limiting member and the spool are each fixed from appreciable movement with respect to one another. Illustratively, the load limiting member's opposing ends may be those portions formed to fit within the bore and couple to the stop member. These opposing ends may have the same size and shape such that either end will fit into either the bore or the stop member and fix movement of the load limiting member relative thereto. The frame may be formed with one or more protrusions or tabs, which couple with voids on the stop member. In the alternative, the stop member may have one or more protrusions or tabs which couple with voids formed in the frame or housing. In any event, when the load limiting member is received within the bore and coupled with the stop member, which in turn is coupled with the frame, then the spool, the load limiting member, and the stop member are all fixed from movement relative to the frame or housing. When so assembled, the load limiting member and the bore each define a longitudinal axis through their centers that is generally co-axial with the longitudinal axis of the other and with the longitudinal axis of the cavity of the frame or housing. A length of a flexible or semi-flexible restraint member, such as a web, may be wound about the spool prior to coupling the stop member to the frame or housing. Such a web may form a part of an occupant restraint system carried by a vehicle. In the event of a deceleration of sufficient force or magnitude, the load limiting member will deform, allowing the pre-wrapped web to pay out in order to limit or reduce the force of the deceleration experienced by the occupant.

Another illustrative load control device comprises at least one mounting member or frame fastened to a load limiting member or frame. In the alternative, a pair of spaced apart mounting members or frames may sandwich therebetween a load limiting member. In any event the mounting member(s) is/are oriented generally transversely to the load limiting member. The load limiting member may have an inverted generally T-shaped profile. The mounting member(s) define a pair of anchor slots each formed to receive therethrough a flexible or semi-flexible restraint member, such as for example a web belt or strap. The anchor slots may be closed or may have an opening through the frame configured to allow a web to be inserted into or removed from the respective anchor slot. Each mounting member or frame further defines one or more cavities formed to receive a stop member, coupler, guide, or fastener, such as for example and without limitation a rivet. The load limiting member defines therethrough a generally longitudinally oriented and variable sized anchor slot or load limiting channel and a generally transversely oriented lower anchor slot separate from and generally perpendicular to the load limiting channel or slot. The variable sized load limiting channel or slot may be wider at the bottom or proximate end of the slot and sized to receive therethrough the fasteners or couplers. The load limiting channel or slot narrows above the fasteners, such that during normal operating conditions the fasteners are substantially fixed from linear movement away from the proximate end relative to the load limiting member. The fasteners pass through the cavities or hole(s) of one mounting member, through the lower portion of the load limiting channel or slot and through the cavities or hole(s) of the other slot in order to fasten together the plates and the inverted T-shaped member. Restraint members or webs may then be passed through each of the three anchor slots, such as for example on an add-on child restraint system or device, such as for example a portable child seat. For example, a pair of shoulder restraint members could be inserted through the pair of anchor slots in each frame and routed up the back of a child seat, and a lower restraint member or crotch strap or web could be inserted into the lower anchor slot of the load limiting member and routed under the seat to a crotch strap, or even anchored to the child seat. A conventional restraint system could comprise the shoulder belts, which could be used to secure an occupant into the child seat. The child seat could be mounted in a vehicle.

Then, in the event that the vehicle experiences a dynamic event or occurrence like a deceleration of predetermined magnitude, such as in the event of an impact with another vehicle, or some other abnormal event, the occupant will be thrown or urged against the should straps, which will elongate a certain amount. Thereafter, the shoulder belts will act against the mounting member frame and its anchor slot(s), while the lower belt will act in an opposite direction against the load limiting member and its anchor slot(s). Eventually, the load will be great enough and the fastener(s) or coupler(s) will move into the narrow portion of the load limiting channel or anchor slot and travel generally linearly therein as the channel yields or plastically deforms. The deformation of the sides of the load limiting channel and the generally linear travel of the fastener(s) or coupler(s) within the channel or slot control, limit or reduce the load or deceleration forces experienced by the occupant.

Another illustrative load control device comprises a frame defining therein one or more restraint member anchor slots and a load limiting member. The load limiting member may be an elongated member such as a bar. The anchor slots may receive one or more restraint members, which may be wrapped or looped around the load limiting member. When a load in excess of a predetermined load is applied to the anchor slots, the load limiting member will yield or deform.

A method of limiting the load from a dynamic event on an occupant of an add-on child restraint system having a restraint harness may comprise the step of threading the restraint harness through a load control device. An additional step may include allowing at least a portion of the load control device to yield or deform under a load.

Yet another illustrative load control device comprises a body member defining an aperture configured to receive a first web therethrough. A first web retainer arm extends from the body member and terminates at a first free end. The first web retainer arm and the body member form a first channel therebetween configured to receive a second web. A second web retainer arm extends from the body member and terminates at a second free end. The second web retainer arm and the body member form a second channel therebetween configured to receive a third web. A limit member may extend from the body member, and is configured to limit travel of the first and second web retainer arms in a direction away from the body member resulting from forces applied to the first and second web retainer arms by the second and third webs respectively.

The limit member may terminate at a distal end with the first and second free ends normally positioned between the body member and the distal end, the distal end of the limit member configured to come into contact with the first and second free ends to thereby limit travel of the first and second web retainer arms as they travel away from the body member. The distal end of the limit member may define a first stop member extending away from the distal end with the first free end of the first web retainer arm positioned between the body member and the first stop member. The distal end of the limit member may define a second stop member extending away from the distal end with the second free end of the second web retainer arm positioned between the body member and the second stop member.

The limit member and the first free end of the first web retainer arm may define therebetween a web access opening to the first channel. The first channel may slope away from the web access opening to the first channel to a terminal end of the first channel. The limit member and the second free end of the second web retainer arm may define therebetween a web access opening to the second channel. The second channel may slope away from the web access opening to the second channel to a terminal end of the second channel.

The first free end of the first web retainer arm may define a protrusion extending into the first channel and configured to facilitate retention of the second web within the first channel. The second free end of the second web retainer arm may likewise define a protrusion extending into the second channel and configured to facilitate retention of the third web within the second channel.

The body member, the first web retainer arm, second retainer arm, and limit member may be of uniform construction. The body member, first web retainer arm, second retainer arm, and limit member may together form a planar structure.

The components of the illustrative load control devices may be fashioned from any suitable metallic, non-metallic, or composite material.

DESCRIPTION OF THE ILLUSTRATIVE EMBODIMENTS

Figure 1:
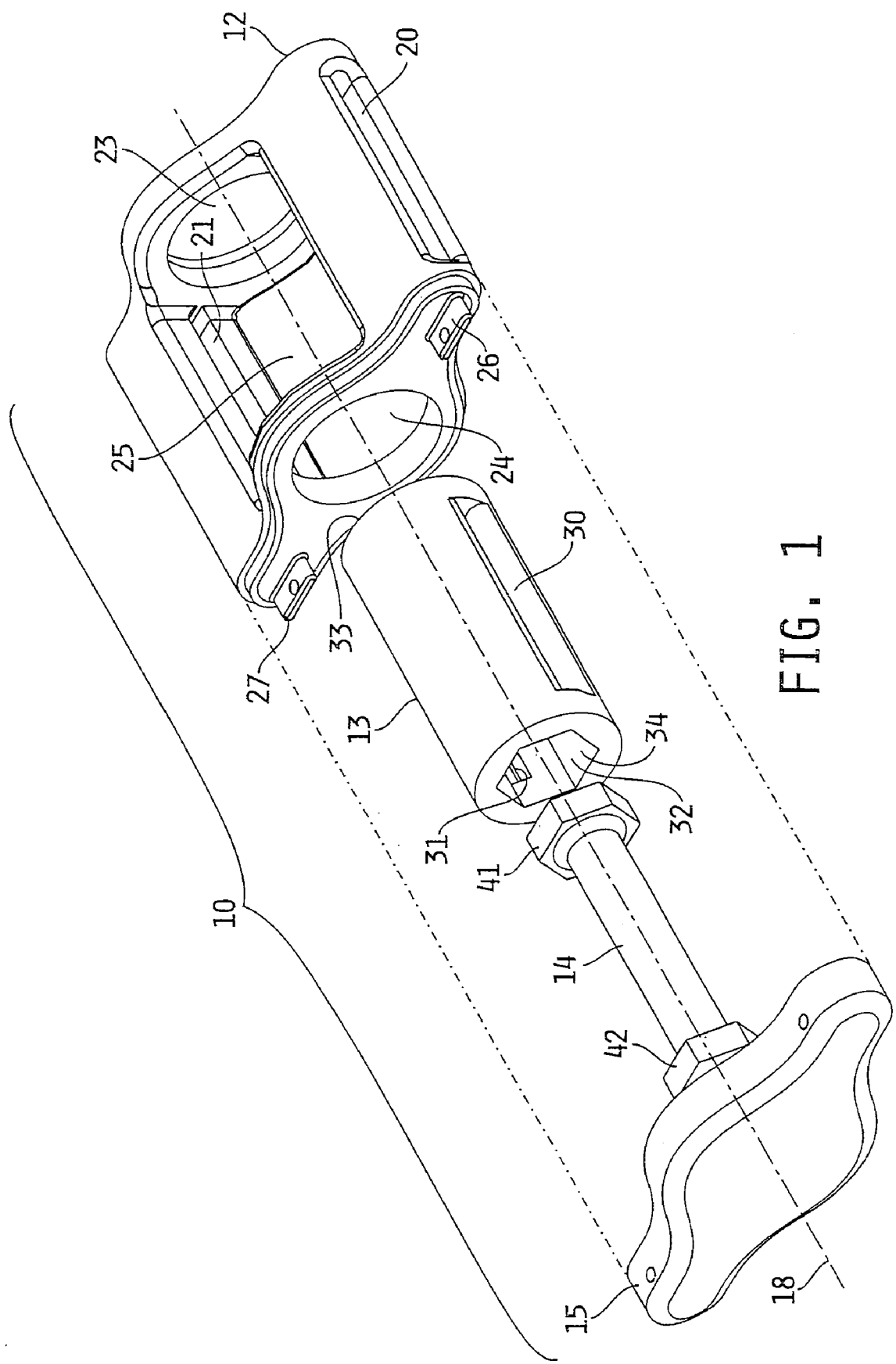
FIG. 1 is an exploded view of an illustrative load control device.

For the purposes of promoting an understanding of the principles of the invention, reference will now be made to illustrative embodiments depicted in the drawings in which like numerals are employed to designate like parts throughout and specific language will be used to describe the illustrative embodiments. It will nevertheless be understood that no limitation of the scope of the invention is thereby intended.

Figure 2:
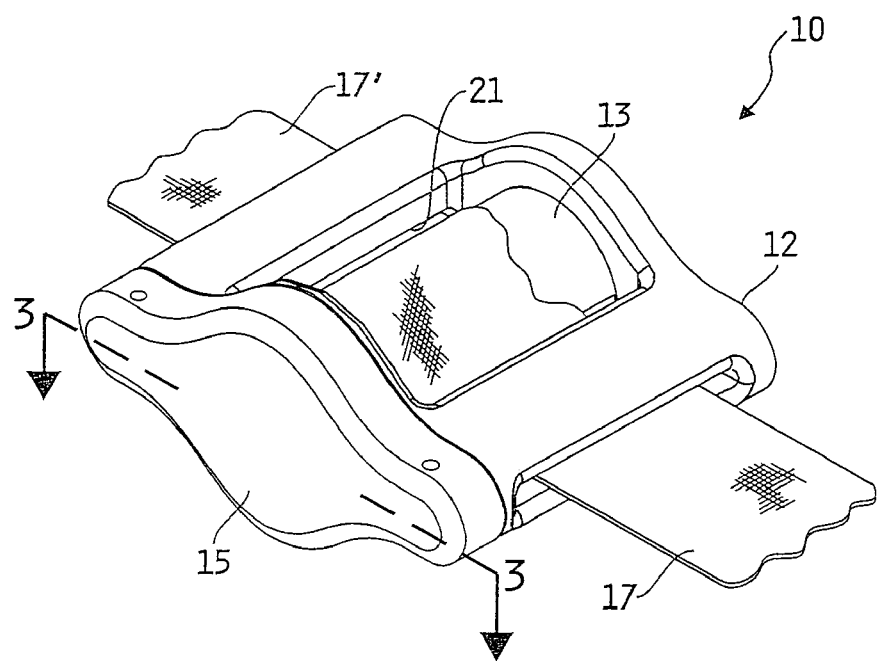
FIG. 2 is a perspective view of the illustrative load control device of FIG. 1.
Figure 3:
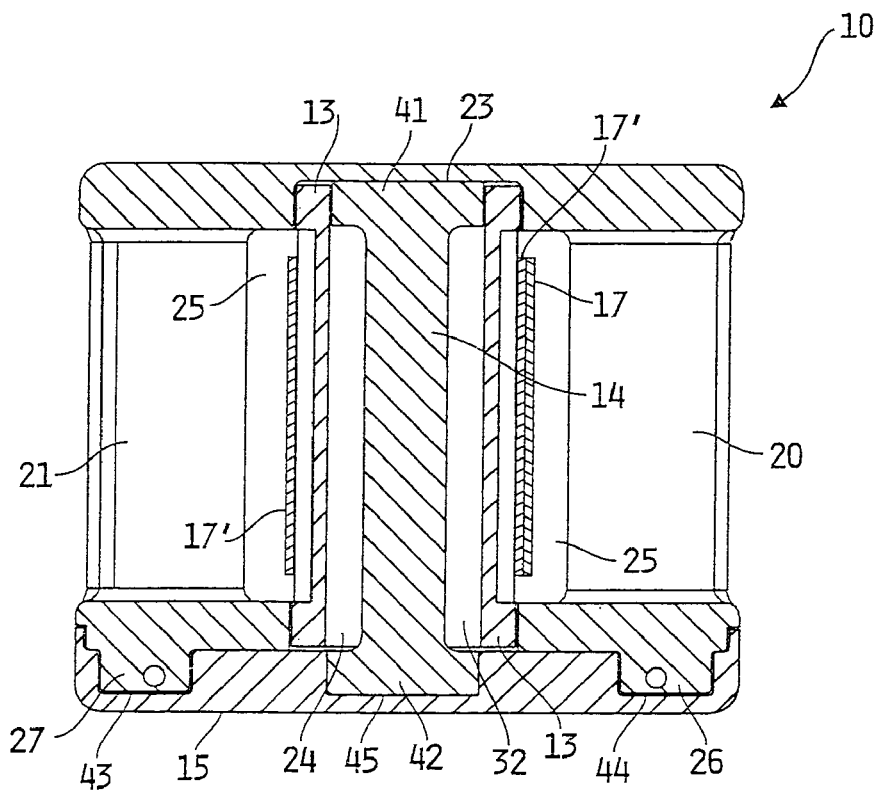
FIG. 3 is a sectional view taken generally along the line 3-3 of FIG. 2.

Referring now to FIGS. 1-3, there is shown an illustrative load control device or load limiter 10 which generally and illustratively comprises a housing or frame 12, a spool 13, a load limiting member or torsion bar 14 and an end cap or stop mechanism 15. As best seen in FIG. 1, the frame 12 generally comprises a pair of spaced apart and longitudinally extending slots 20, 21, a first end wall defining hole or cavity 23, a second end wall defining an end hole or cavity 24 therethrough, a recess or cavity 25 defined by and extending longitudinally between the first and second end walls and transversely between the slots 20, 21, and a pair of spaced apart protrusions or stop tabs 26 and 27 disposed on the second end wall on either side of end hole 24. The slots 20 and 21 illustratively are generally aligned with one another, although they need not be aligned.

The spool 13 illustratively comprises a pair of spaced apart and longitudinally extending slots 30 and 31, and a bore 32 extending longitudinally through the spool and opening through opposing ends 33 and 34. The slots 30 and 31 illustratively are generally aligned with one another, although they need not be aligned. The bore 32 illustratively has a hexagonal cross-section. The opposing ends of load limiting member or torsion bar 14 each illustratively comprise a hexagonal-shaped end member or portion 41 and 42. First opposing end 41 is received through and shaped to fit snugly in bore 32, such that the load limiting member 14 is substantially fixed against rotational movement relative to the spool 13 when received through the bore 32. It will be appreciated that the bore 32 need not open through opposing end 33. Whether open or not, opposing end 33 illustratively is shaped to receive and fix against movement first opposing end 41 of load limiting member 14. It will be appreciated that while both the bore 32 and the first opposing end 41 have an hexagonal shape, they need not, so long as their shapes are complementary in that the end 41 has substantially the same shape as the bore 32 and is sized to fit therein in a manner to resist rotational movement relative to the bore 32. Therefore, the end 41 and bore 32 may have for example and without limitation any polygonal, ovate, oblong, or ellipsoid shape so long as they are complementary with each other. It will also be appreciated that the entire length of the bore 32 need not likewise have a complementary shape so long as at least opposing end 33 and end 41 are complementary and cooperate to fix the load limiting member 14 against movement relative to the spool 13.

As best seen in FIG. 3, the load limiting member 14 illustratively has a length in excess of the length of the spool 13 such that second opposing end 42 extends beyond opening 34 when first opposing end 41 is fully seated in opposing end 33.

End hole or cavity 24 is sized to receive therethrough and support the spool 13, and recess 23 is sized to support the spool 13 when mounted within the cavity 23. When thus disposed in the cavity 25, the spool is free to move within the cavity 25 relative to the housing 12. Thus, the spool is generally free floating when disposed within the cavity 25 defined by the frame 12, and may rotate generally about axis 18.

Illustratively, stop member or end cap 15 is formed with substantially the same vertical cross-section as frame 12 and is sized to fit over the second end wall of the frame or housing 12. As best seen in FIG. 3, the inner side of the cap 15, which mounts to the second end wall of frame 12, defines therein a pair of spaced apart coupling recesses 43 and 44, and a mounting recess 45. First mounting recess 43 is sized to mate with mounting tab 27 and second mounting recess 44 is sized to mate with mounting tab 26. Third or central mounting recess 45 is sized to mate with second opposing end 42. Illustratively, therefore, recess 45 and second opposing end 42 have complimentary hexagonal shapes such that opposing end 42 fits snugly within recess 45 and is thereby stopped from rotating relative to the end cap 15 and vice versa. It will be appreciated that the recess 45 and end 42 may have any complimentary polygonal shape, and that the shape and size of end 42 may but need not be the same as that of end 41. So too, the recess 45 and opposing end 42 may have complimentary oblong, ovate, or ellipsoid shapes.

The load limiting device 10 illustratively is assembled as follows. The spool 13 is inserted through end hole 24 until end 33 is positioned in recess 23. When so mounted within cavity 25, the spool 13 is generally concentric with the cavity 25 and coaxial with the longitudinal axis 18 running substantially through the center of cavity 25 proceeding from recess 23 through end hole 24, and is generally free to rotate thereabout. The load limiting member or load limiting member 14 is received through the bore 32 as described and end 41 is seated in complimentary end 33, thereby fixing the load limiting member 14 from rotational movement relative to the spool 13. When so mounted within the bore 32, the load limiting member 14 is generally concentric with the spool 13, and if the spool 13 is already mounted within the cavity 25 as described, then concentric with the cavity 25 and coaxial with longitudinal axis 18. It will be appreciated that the spool may be inserted into the cavity 25 and then the load limiting member 14 inserted into the bore 32, or, in the alternative, the load limiting member 14 may first be inserted into the bore 32 followed by the mated load limiting member 14 and spool 13 being inserted into the recess 25. In any event, the load limiting member 14 generally will rotate about axis 18 in fixed relation with the spool 13 when the two are mounted in the cavity 25 unless stopped from moving by the end cap 15.

The end cap 15 is mounted to the assembled frame 12, spool 13 and load limiting member 14 combination by receiving into respective recesses 43, 44 and 45 the mounting tabs 27 and 26 of the frame 12 and the second opposing end 42 of the load limiting member 14. The mating of the spaced apart mounting tabs 26 and 27 with the recesses 43 and 44 prevent the end cap 15 from rotating about the longitudinal axis 18 of the frame 12. In turn, because end 42 is received within complementary recess 45, the load limiting member 14, and the spool 13 thereby, are also fixed from rotational movement relative to the frame 12. In other words, when second opposing end 42 is inserted into central mounting recess 45, and when mounting tabs 26 and 27 are inserted or received into respective mounting recesses 44 and 43, the end cap 15 and load limiting bar 14 are generally locked or fixed from rotational movement relative to one another and can be considered to be a part of the frame. Thus, in its fully assembled condition depicted in FIG. 2, the concentric and coaxial spool 13 and load limiting member 14, and the end cap 15 generally are all locked or fixed from rotational movement about the common longitudinal axis 18 and relative to the frame 12.

A restraint member 17, which illustratively is a flexible or semi-flexible member such as for example and without limitation a belt, web, strap and the like, may be inserted and extended through slot 20, proceeding through slot 30, transversely across cavity 25 and bore 32, through slot 31 and through slot 21. The slots 20, 21, 30, 31 may be sized to accommodate the width and thickness of the web 17. It will be appreciated that the web 17 may also be inserted in other suitable orders, for example in reverse order by entering through slot 21 and exiting through slot 20 after proceeding through the intervening slots 31, 30, 20, recess 25, and bore 32, and that the web 17 may alternatively be passed over or under the load limiting member 14. After the web 17 is threaded through the load control device 10, the spool 13 and load limiting member 14 may be rotated relative to the frame 12 in order to wrap web 17 about the spool 13. Although the combination spool 13 and load limiting member 14 may be rotated in either direction, illustratively, it will be rotated in the counterclockwise direction with reference to FIGS. 1-3.

As the spool 13 and load limiting member 14 combination are illustratively rotated in the counterclockwise direction, web 17 is taken in through slot 20 and wrapped about the spool 13 generally in a clockwise direction. The more the spool 13 and load limiting member 14 are turned, the more web 17 is threaded or drawn into the frame or housing 12 and wrapped about the spool 13. At the same time, the portion 17' of web 17 that extends outwardly from slot 21 is threaded drawn in through slot 21 and wrapped about the spool 13 generally in a counterclockwise direction. So too, the more the spool 13 and load limiting member 14 are turned, the more web 17' is drawn into the housing 12 and wrapped about the spool 13. Also, as best seen in FIG. 3, the spool 13 is rotated, the web portion 17' will wind about the spool 13 adjacent to and in underlying fashion to the web 17 being drawn in through slot 20. When the desired amount of web 17, 17' has been wrapped about the spool 13, the mated spool 13 and load limiting member 14 combination may be normally stopped or fixed from rotation about the common longitudinal axis 18 relative to the housing 12 by mounting the end cap 15 to the frame 12 and load limiting member 14 as described herein. It will be appreciated that the web 17, 17' may be wrapped about the spool 13 prior to mounting the spool 13 in frame 12, and then the free ends of the web 17, 17' passed through respective slots 20 and 21.

Those skilled in the art will appreciate that the described load control device 10 may be mounted in line, for example to a restraint system such as an add-on child restraint system, including without limitation any conventional portable child seat. For example, web 17 may extend between a connector configured to lockingly engage a rigid member, such as a round bar attached to a vehicle in the bight of the vehicle's seat, and a portable child seat body with the load control device 10 mounted to the web 17 between the rigid member and the child seat. An example of such a rigid member is defined in Federal Motor Vehicle Safety Standard 225 (FMVSS 225) codified at 49 C.F.R. § 571.225, and now incorporated herein by reference. Or, web 17 might for example be part of the harness on the child seat or on any other restraint, with the load control device 10 mounted to the web 17 as described. In contrast to the in-line load control device 10, load control device 10', FIGS. 4-6, may be rigidly mounted, for example to the vehicle, or to the child seat and to the web 17 as otherwise described herein. For example, the load control device 10' may be mounted to the rear of a child seat with either the child seat's restraint harness or the web that mounts the child seat to the vehicle being wound about the spool 13 as further described herein. Of course, any number of in-line 10 or mounted 10' devices or combination thereof may be used as desired. The invention is adaptable for use with any restraint system, such as a three-point or five-point restraint system on an add-on child restraint system like a portable child seat. For example and without limitation, restraint member 17, 17' may be a crotch strap restraint member of a restraint harness; or it may be a should strap restraint member. Thus, load control devices 10, 10' could be adopted for use with the harness crotch strap, with one or more of the harness shoulder straps, with one or more of the webs that mount the child seat to a vehicle or with one or more combinations of the above.

Figure 4:
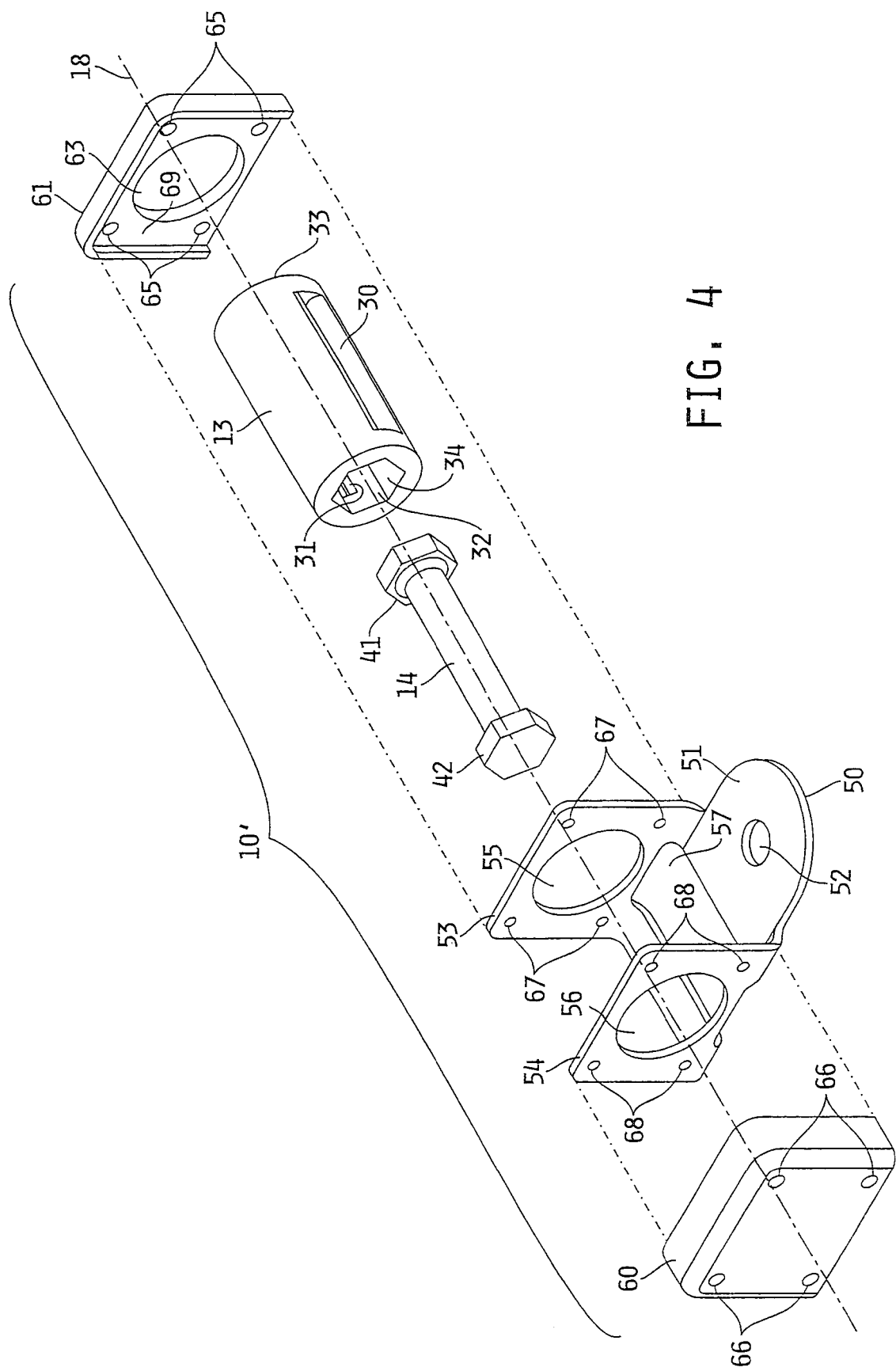
FIG. 4 is an exploded view of another illustrative load control device.
Figure 5:
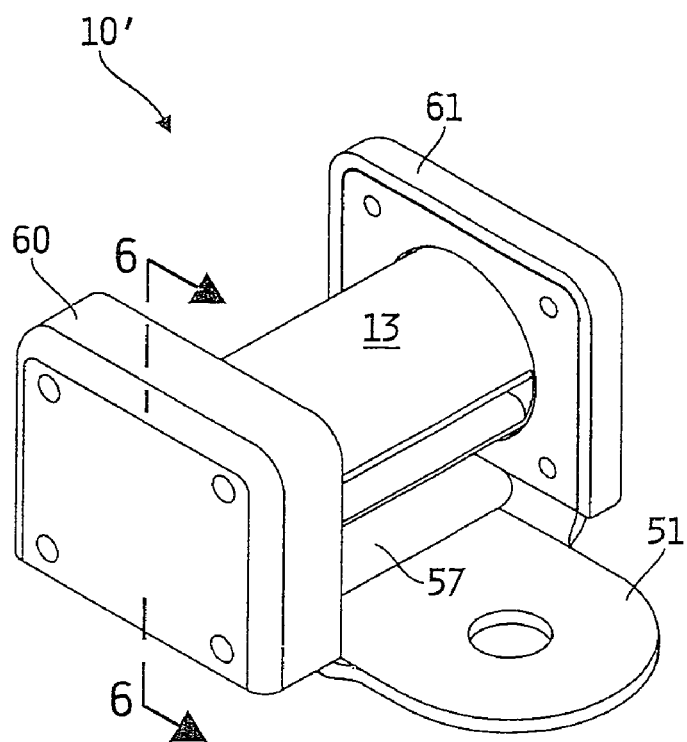
FIG. 5 is a perspective view of the illustrative load control device of FIG. 4.
Figure 6:
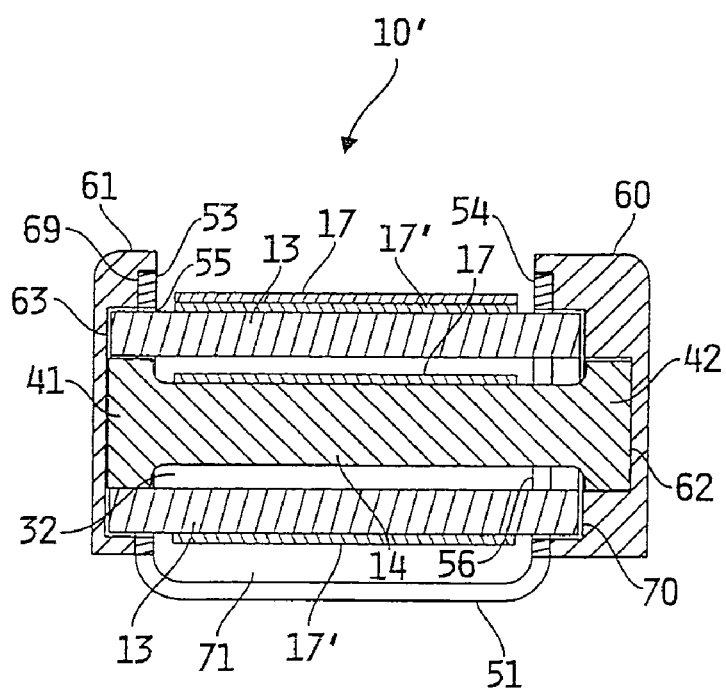
FIG. 6 is a sectional view taken generally along the line 6-6 of FIG. 5.

Referring to FIGS. 4-6, load control device or device 10' will now be described. The structure and operation of load control device 10' is substantially identical to that of load control device 10 in many respects, and substantial similar in many other respects. Like numerals will be used in the description of device 10 to describe like components in device 10'. Load control device 10' generally comprises a frame 50, a stop cover 60, a retaining cover 61, a spool 13 and a load limiting member 14. The frame 50 of load control device 10' replaces the frame 12 of device 10. Frame 50 generally comprises a mounting portion 51 and a pair of spaced apart side walls 53 and 54 protruding generally perpendicularly to the mounting portion 51. Generally coplanar with and adjacent to the mounting portion 51 and longitudinally disposed between the side walls 53 and 54 is an aperture 57. The mounting portion 51 defines a mounting hole 52 sized to receive a conventional fastener, for example, but not limited to, a screw, a bolt, a rivet, and the like to mount the frame 50, for example to a vehicle or portable child seat. Side wall 53 defines a generally centrally located spool mounting hole 55 and a plurality of end cover 61 mounting apertures 67. Side wall 54 defines a generally centrally located spool mounting hole 56, which is generally aligned and coaxial with longitudinal axis 18, and defines a plurality of end cover 60 mounting apertures 68.

Stop cover 60, illustratively defines a plurality of mounting apertures 66, and, as best seen in FIG. 6, frame and spool mounting recess 70 which further defines a load limiting member recess or mounting recess 62. The stepped mounting recess 70 is sized to receive and mount to side wall 54 by conventional fasteners inserted through the mounting apertures 66, which are aligned with apertures 68. The two outer steps of recess 70 are adjacent to the side wall 54. The next two steps inward from the two outer steps are adjacent to a portion of the periphery and end of end portion 34 of spool 13, such that the spool is free to rotate within the recess about the longitudinal axis 18, but not free to move longitudinally against the cover 60 when fastened to the frame 50. The final steps inward define the sides of the load limiting member mounting recess 62. Mounting recess 62 may have any polygonal, ovate, oblong, or ellipsoid shape complimentary with the shape of end 42 as was described with device 10 above. Illustratively, the complimentary shape of mounting recess 62 is hexagonal and sized to snugly receive therein end 42 and normally fix the end 42, and the load limiting member 14 thereby, against rotational movement relative to the cover 60. Retaining cover 61 defines a mounting recess 69 which is sized to receive therein side wall 53 when fasteners are passed through mounting apertures 65 and corresponding apertures 67 in side wall 53 to mount the cover 61 to the frame 50. The mounting recess 69 defines a centrally located spool mounting hole 63, which freely supports the spool 13, allowing the spool to rotate about axis 18, but restricting longitudinal movement of the spool 13 against the retaining cover 61.

The spool 13 and load limiting member 14 of load control device 10' are each substantially identical to the spool 13 and load limiting member 14 of previously described load control device 10. For the sake of brevity, therefore, the description of theses two components will not be repeated here, it being understood that the sizes, polygonal shapes and material and method of manufacture of the components may vary not only between the illustrative embodiments 10, 10', but also between versions of each load control device 10 and device 10'.

The load limiting device 10' illustratively is assembled as follows. The load limiting member 14 is received by or inserted into the bore 32, which as noted above may have an overall shape and size complimentary to that of the shape of end 41 or may alternatively have just its end 33 of complimentary shape and size to receive and fix end 41 from rotational movement relative to the spool 13. The spool 13 is disposed through mounting holes 55 and 56, and within mounting recess 63. Retaining cover 61 may be fastened to side wall 53 either before or after the spool is disposed through mounting holes 55 and 56. Likewise, the load limiting member 14 may be inserted within the spool 13 before or after the spool is disposed in through mounting holes 55 and 56. Once disposed through holes 55 and 56, the spool 13, load limiting member 14, and holes 55 and 56 are concentric and coaxial, with the spool 13 and load limiting member 14 free to rotate about axis 18 in fixed relation with each other until such time as the stop cover 60 is fastened to the frame 50.

Before the stop cover 60 is fastened to the frame 50, the flexible or semi-flexible restraint member 17 such as a belt, web, strap and the like, may be threaded or inserted and extended through slot 30, proceeding transversely across bore 32, and outwardly through slot 31. As noted above, the slots 30, 31 may be sized to accommodate the width and thickness of the web 17. It will be appreciated that the web 17 may also be inserted in other suitable orders, for example in reverse order by entering through slot 31 and exiting through slot 30 after proceeding through bore 32, and that the web 17 may alternatively pass over or under the load limiting member 14 as desired. After the web 17 is threaded through the load control device 10', the spool 13 and load limiting member 14 may be rotated relative to the frame 50 in order to wrap web 17 about the spool 13. Although the combination spool 13 and load limiting member 14 may be rotated in either direction, illustratively, the rotation will be described in the counterclockwise direction with reference to FIGS. 4-6.

As the spool 13 and load limiting member 14 combination are illustratively rotated in the counterclockwise direction, web 17 is wrapped about the spool 13 generally in a clockwise direction. The more the spool 13 and load limiting member 14 are rotated, the more web 17 is wrapped about the spool 13. At the same time, the portion 17' of web 17 that extends outwardly from slot 31 is wrapped about the spool 13 generally in a counterclockwise direction. So too, the more the spool 13 and load limiting member 14 are turned, the more web 17' is wrapped about the spool 13. Also, as best seen in FIG. 6, as the spool 13 is rotated, the web portion 17' will wind about the spool 13 adjacent to and in underlying relation to the web 17 being wound in from the right side of the device 10'. When the desired amount of web 17, 17' has been wrapped about the spool 13, the mated spool 13 and load limiting member 14 combination may be normally stopped or fixed from rotation about the common longitudinal axis 18 relative to the frame 50 by fastening the stop cover 60 to the frame 50 and thereby receiving and mounting the load limiting member 14 within complimentary recess 62 as described above. Any conventional fastener, including without limitation a screw, a bolt, or a rivet, may be used to fasten the covers 60, 61 to the frame 50 using respective apertures 65, 66, 67, 68. It will be appreciated that the web 17, 17' may be wrapped about the spool 13 prior to mounting the spool 13 to the frame 50.

The components of the various embodiments of the load control device 10, 10' may be fashioned out of any suitable metallic, non-metallic, or composite material or any combination thereof and by any method of manufacture suitable to the material used. Without intent to limit the scope of the invention or the materials and manufacture to be used, some illustrative examples will now be given. Illustratively, spool 13 may be die cast from zinc or other suitable metal. The load limiting member or torsion bar 14 may also be fashioned from metal using for example a cold-metal process. The end cap 15 may be die cast as well, for example from aluminum. The frame 12 illustratively may be fashioned from plastic. So too the covers 60, 61 may be metal or plastic, and the frame 50 may be stamped from steel or other suitable material.

In operation the load control devices 10, 10' operate in substantially the same manner as will now be described. As described above, the load control device 10, 10' is mounted to a restraint member, for example a restraint harness or a restraint member that mounts to a vehicle a child seat having a restraint harness, or any combination thereof. When assembled and mounted as described above, the load limiting member 14 is locked against rotational movement or fixed at one end 41 in the spool 13 which is generally free-floating and at the opposite end 42 in the stop member 15 or 60, which normally locks, stops or restricts the ability of the coupled or mated load limiting member 14 and spool 13 combination to rotate relative to the frame 12 or frame 50.

As noted above, the load control device 10, 10' is mounted to a restraint member. For example, one of more of the load control embodiments 10, 10' alone or in combination, may be mounted to a web 17 between where the web 17 is attached to an add-on child seat and where the web attaches to a rigid member mounted to the vehicle. In the event of a dynamic event such as a sudden or great deceleration, as for example in the event of an impact between the vehicle and another body, the inertia of the occupant of the child seat will throw the occupant against the child seat's restraint harness, which in turn will apply a force to the web 17 anchoring the child seat to the vehicle. As a certain amount of force is applied, the web 17, 17' wrapped about the spool 13 will be urged in a withdrawal direction, illustratively in the clockwise direction, but will be stopped from such unwrapping movement by the respective stop member 15 or 60. Eventually, the force, which is transferred to the spool 13 and thereby to the coupled or mated load limiting member 14, will be so great as to deform the load limiting member 14 thereby allowing the free-floating spool 13 to rotate and the web 17 to unwind and payout from the spool 13. Therefore, the load limiting member, through yielding, twisting and perhaps eventually deforming over time, absorbs much of the deceleration or impact energy. This deformation may be plastic, although it is anticipated that the illustrative load control device 10, 10' will be reusable after a crash or other dynamic event. The amount of torque or twisting force at which the load limiting member or torsion member 14 deforms, may be predetermined. So too, the amount of web 17 wrapped around the spool 13 may be predetermined to give a desired result. The energy dissipation or absorption over time until deformation and the subsequent easing of tension through web 17 payout allows the load control device 10, 10' to better protect an occupant by producing more favorable occupant injury criteria, as defined by relevant local and federal regulations and standards known to those skilled in the art in the form of lower occupant HIC values, occupant chest "g" forces, occupant head and knee excursions and other injury criteria such as NIJ.

Figure 7:
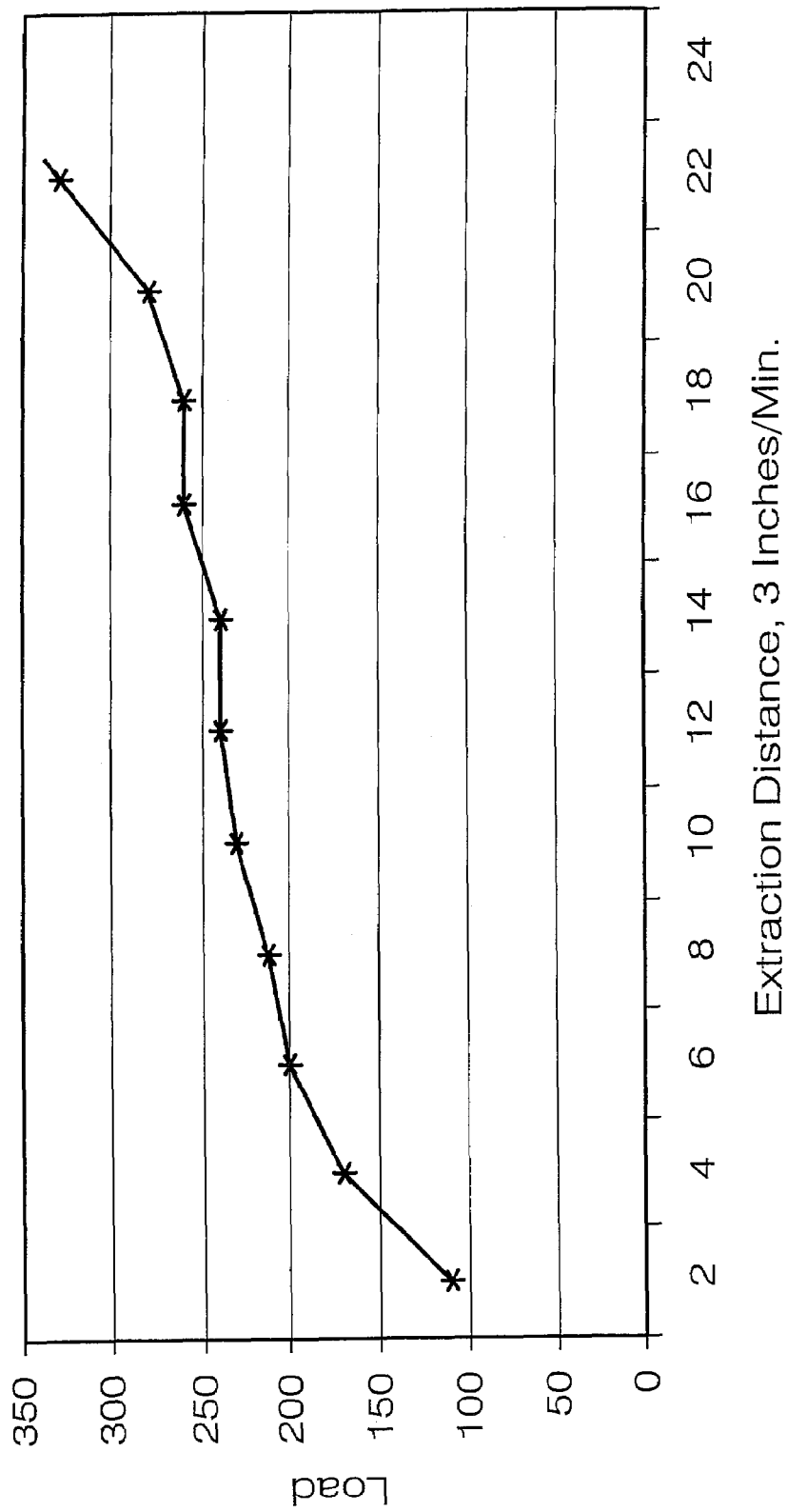
FIG. 7 is a diagram of the tensile characteristics of the illustrative embodiments.
Figure 8:
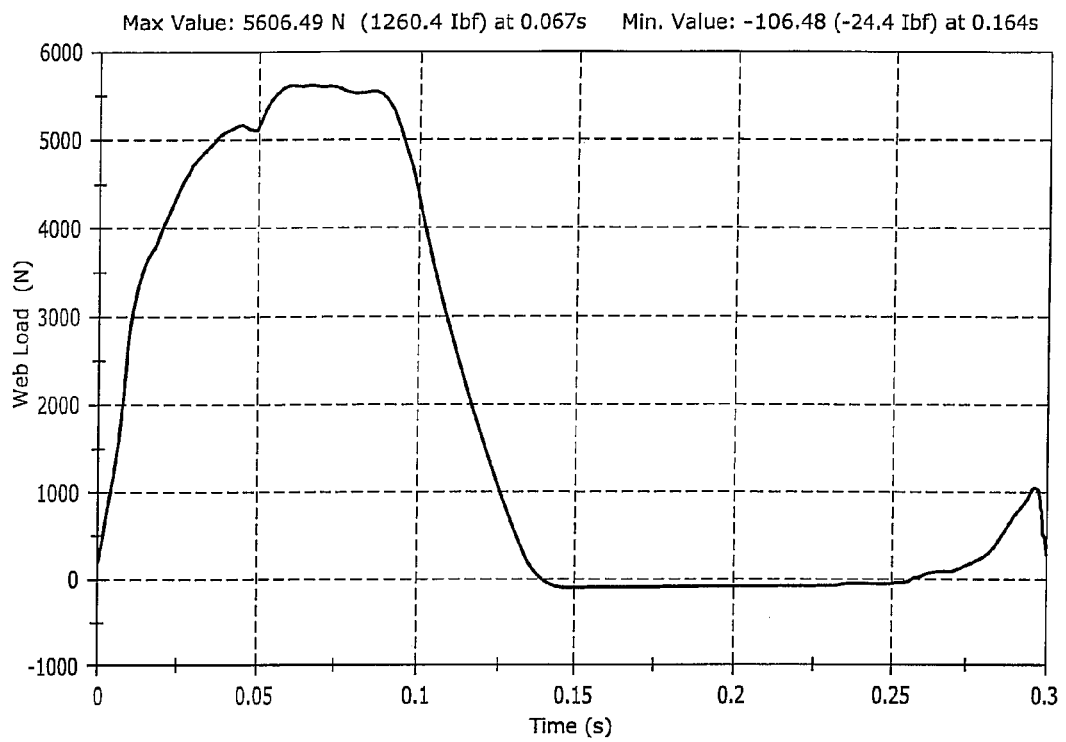
FIG. 8 is a diagram of the load characteristics of the illustrative embodiments.
Figure 9:
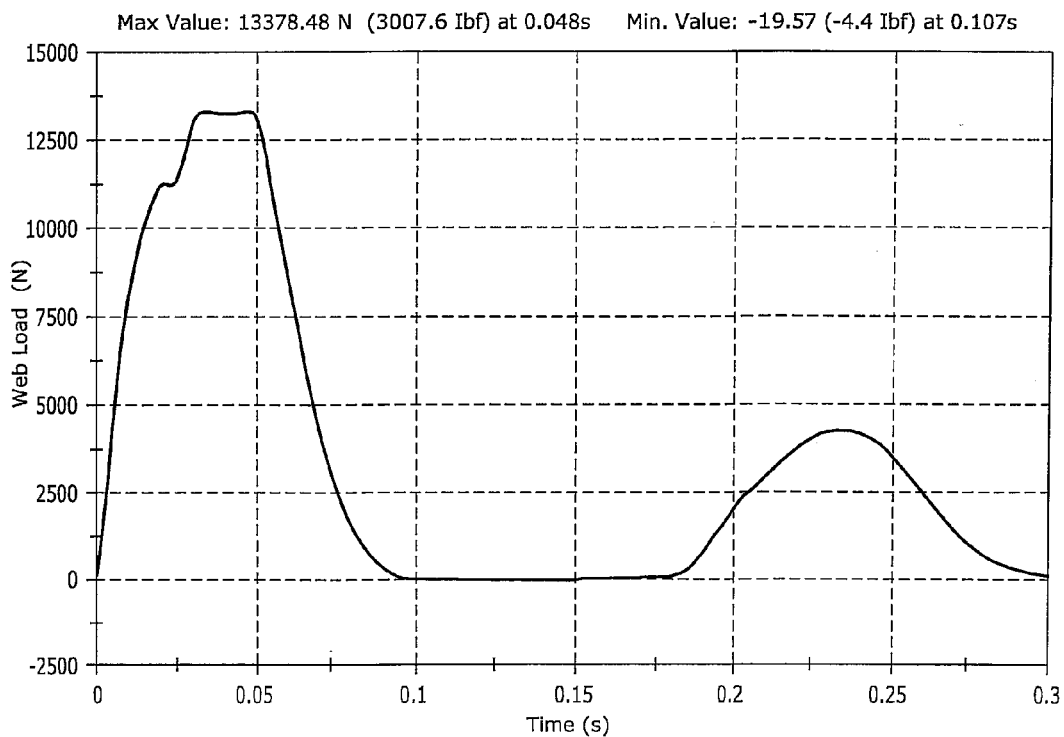
FIG. 9 is a diagram of the load characteristics without the use of the illustrative load control device.

Referring to FIG. 7, a plot of the belt 17 extension versus the load applied to in-line load control device 10 as conducted in a tensile chamber. The load applied was 3 inches per minute. The plot shown in FIG. 8 shows the load curve on the web 17 having an illustrative load control device 10, 10' mounted thereto and resulting from a pendulum hit. The maximum load on the web 17 was about 5606 N, occurring at about 0.067 seconds, with the majority of the force being spread out over about 0.05 seconds. In contrast, FIG. 9 plots the load curve produced by a web 17 not equipped with a load control device 10, 10', but otherwise subjected to a pendulum test identical to the one that produced the plot in FIG. 8. The maximum load on the web not equipped with any of the above described illustrative load control devices was about 13,378 N, occurring at about 0.048 seconds, with the majority of the load spread out over about 0.025 seconds.

Figure 10:
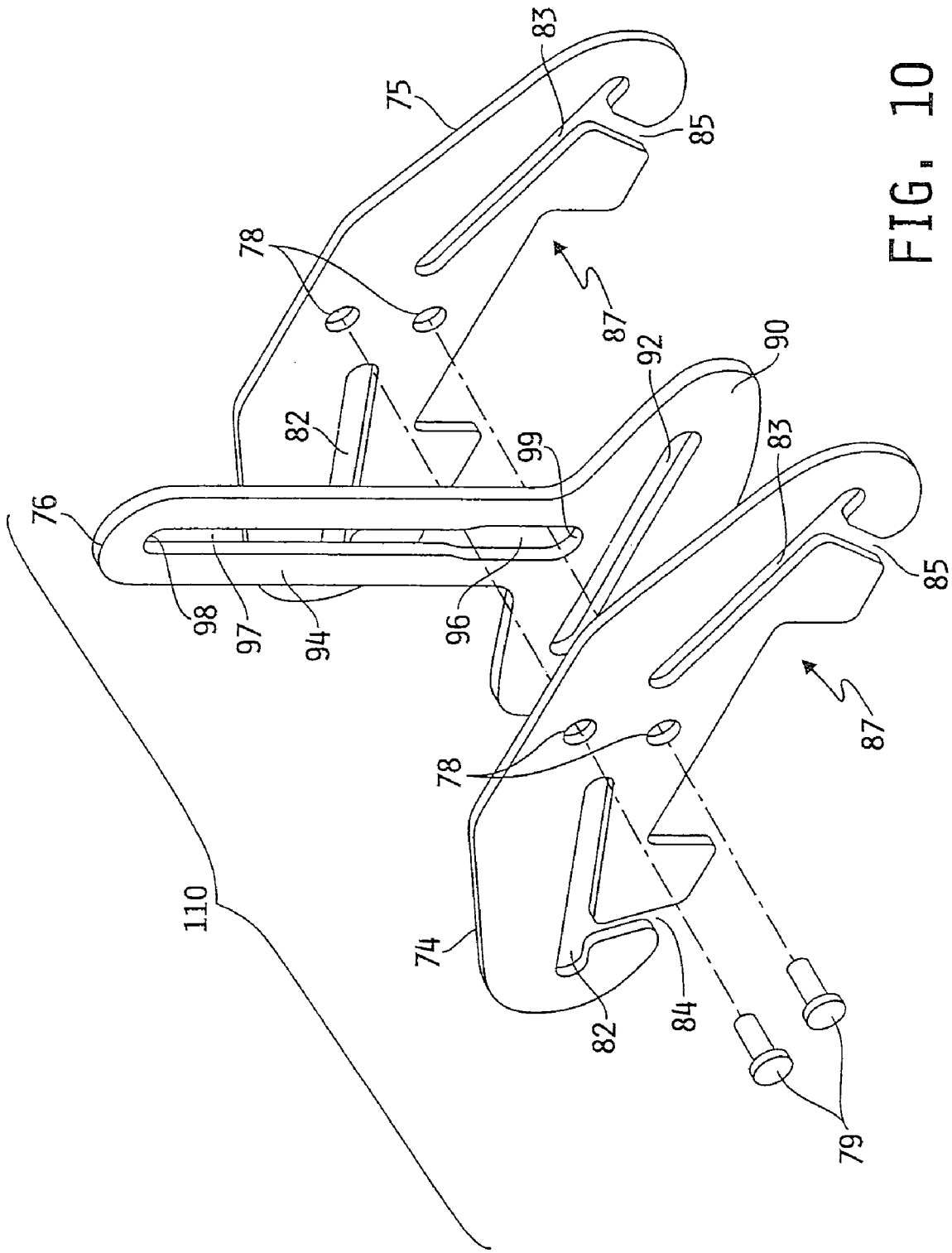
FIG. 10 is an exploded view of an illustrative linear load control device.
Figure 11:
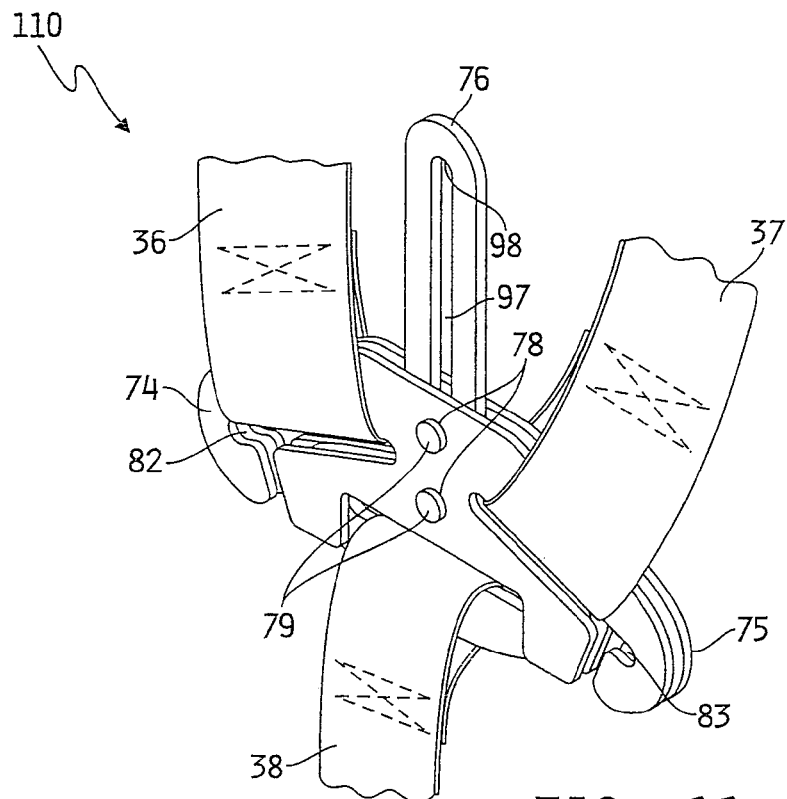
FIG. 11 is a perspective view of the illustrative load control device of FIG. 1.
Figure 12:
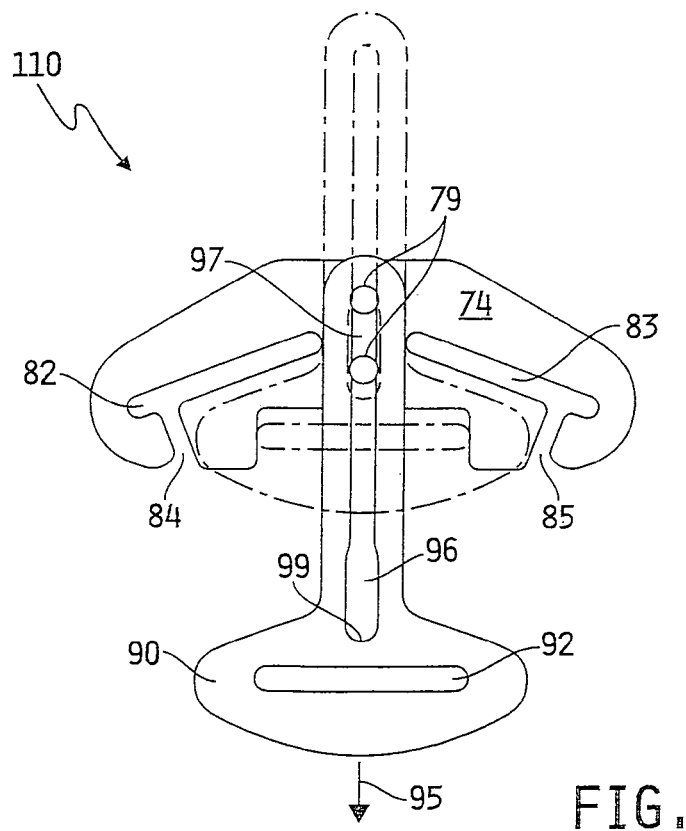
FIG. 12 is a partial diagrammatic view of another illustrative linear load control device showing the device in a normal state and in an actuated state.

Referring to FIGS. 10-12, a further illustrative load control device 110 is depicted. This load control device 110 dissipates energy in a generally linear manner. The illustrative linear load control device 110 generally comprises a load limiting member 76 coupled to a belt mounting member 74 as best seen in FIG. 12. The load limiting member 76 and the belt mounting member 74 may each be considered as a frame, either alone or when joined together with each other. Illustratively, the load limiting member or frame 76 is an inverted generally T-shaped member comprising an anchor slot or load limiting channel 96 and an anchor slot 92. The anchor slot 92 is formed in the transverse portion 90 of the frame 76 and is sized to receive therethrough and mount a restraint member 38 which illustratively may be a flexible member such as for example and without limitation a belt, a strap, a web, and the like. Restraint member illustratively is received by and looped through the anchor slot 92 and sewn to itself. Such a flexible member 38 illustratively may be a crotch strap or member of a restraint harness on an add-on child restraint system such as for example a portable child seat for use with a vehicle. Rather than being mounted in-line on the child restraint harness, the anchor slot 92 may be mounted or coupled directly to the child seat without the use of flexible member 38. So too, flexible restraint member 38 may be releasably received by anchor slot 92 rather than sewn in place. For example and without limitation the restraint member 38 may be coupled to anchor slot 92 by hook and loops, by snaps, by zipper, or the like. The load limiting channel 96 is generally perpendicular to anchor slot 92 such that the channel 96 has a proximate end 99 near the anchor slot 92 and a distal end 98 located opposite to the proximate end 99. The proximate end 99 is sized to receive and nestle one or more protrusions, mounting members couplers, and/or fasteners, as desired, such as for example and without limitation a rivet(s) 79 or other suitable fastener or coupler. The load limiting channel 96 narrows moving away from the proximate end 99 toward the distal end 98 to form the load-limiting portion 97 of the channel 96. The narrower load limiting portion 97 normally fixes the fasteners 79 generally in the proximate end 99. Thus, under normal operating conditions, as will be described below, the mounting member 74 will also be fixed from movement relative to the load limiting member 76.

The belt mounting member 74 comprises one or more anchor slots 82 and 83 sized to receive and couple or mount thereto one or more flexible, semi-flexible, semi-rigid or rigid restraint members, such as for example and without limitation a belt, strap or web. The illustrative embodiment shows two restraint members 36 and 37 threaded or passed through the slots 82 and 83 and sewn back on themselves. A single anchor slot could be defined in mounting member 74 to receive both restraint members 82, 83 or a single anchor slot could be defined to receive a single restraint member, which for example might be the bottom member or portion of a Y-shaped shoulder restraint. The slots 82 and 83 may be closed, although the illustrative embodiment has respective openings 84 and 85 in the slots 82, 83 to allow a belt(s) 36, 37 to be inserted and removed from the slots 82, 83 as is in the experience of those skilled in the art.

Any suitable coupler or fastener or coupling device 79 may be used to join or couple together the load limiting member or frame 76 and the belt mounting member or frame 74. As depicted in FIGS. 10 and 11, a second mounting member, plate or frame 75, illustratively which is substantially identical to mounting member 74, may but need not be coupled or joined with the mounting member 74 and load limiting member 76. Illustratively, in such a case, the load limiting member 76 may be sandwiched between the two mounting members 74 and 75, with their respective slots 82 and 83 and hole(s) 78 generally aligned and with the fastener(s) 79 passing through hole(s) 78 of mounting member or frame 74, 75. When coupled together, the anchor slot 92 illustratively is generally aligned with an indentation 87, which could also be another slot if desired, formed in the mounting member(s) 74, 75 to allow the flexible member 38 to pass through the slot 92. Also when coupled together as described, the mounting member(s) 74, 75 are oriented, for example, generally transversely to the inverted generally T-shaped load limiting member 76. Illustratively the one or more coupler(s) or fastener(s) 79 are passed through one or more hole(s) 78 defined or formed in the belt mounting member, plate or frame 74, then through the proximate end or mounting portion 99 of load limiting channel 96, then, if used, through mounting member, plate or frame 75. The order could be reversed with the fastener(s) passing first through mounting member 75, if used, and then, or initially if mounting member 75 is not used, through mounting member 74. In one illustrative coupler alternative, protrusions could be formed directly in the mounting member(s) 74, 75, which protrusions could be received within the load limiting channel. In any event, because the mounting portion 99 is sized to receive and nestle the couplers, fastener(s), or protrusions, and because the load limiting portion 97 of the channel or slot 96 is narrower than the mounting portion 99, the load limiting member 76 normally is generally fixed from substantial linear movement, i.e., movement along the length of the load limiting channel or slot 96, relative to the mounting member 74 under normal conditions.

Just as one or two mounting members, plates or frames 74, 75 fall within the scope of the invention, so too does the use of the load limiting member or frame 76 without any additional members. For example and without limitation, the crotch strap restraint member 38 could be received by the anchor slot 92 and the shoulder restraint members 36, 37, or a single restraint member that diverges into two shoulder restraint members as in a Y-shaped restraint member, could be received and fixed from substantial linear movement by the load limiting channel or anchor slot 96. Illustratively and without limitation, such a restraint member or members 36, 37 could be looped around a coupler received and normally fixed from movement by the load limiting channel or anchor slot 96.

Figure 13:
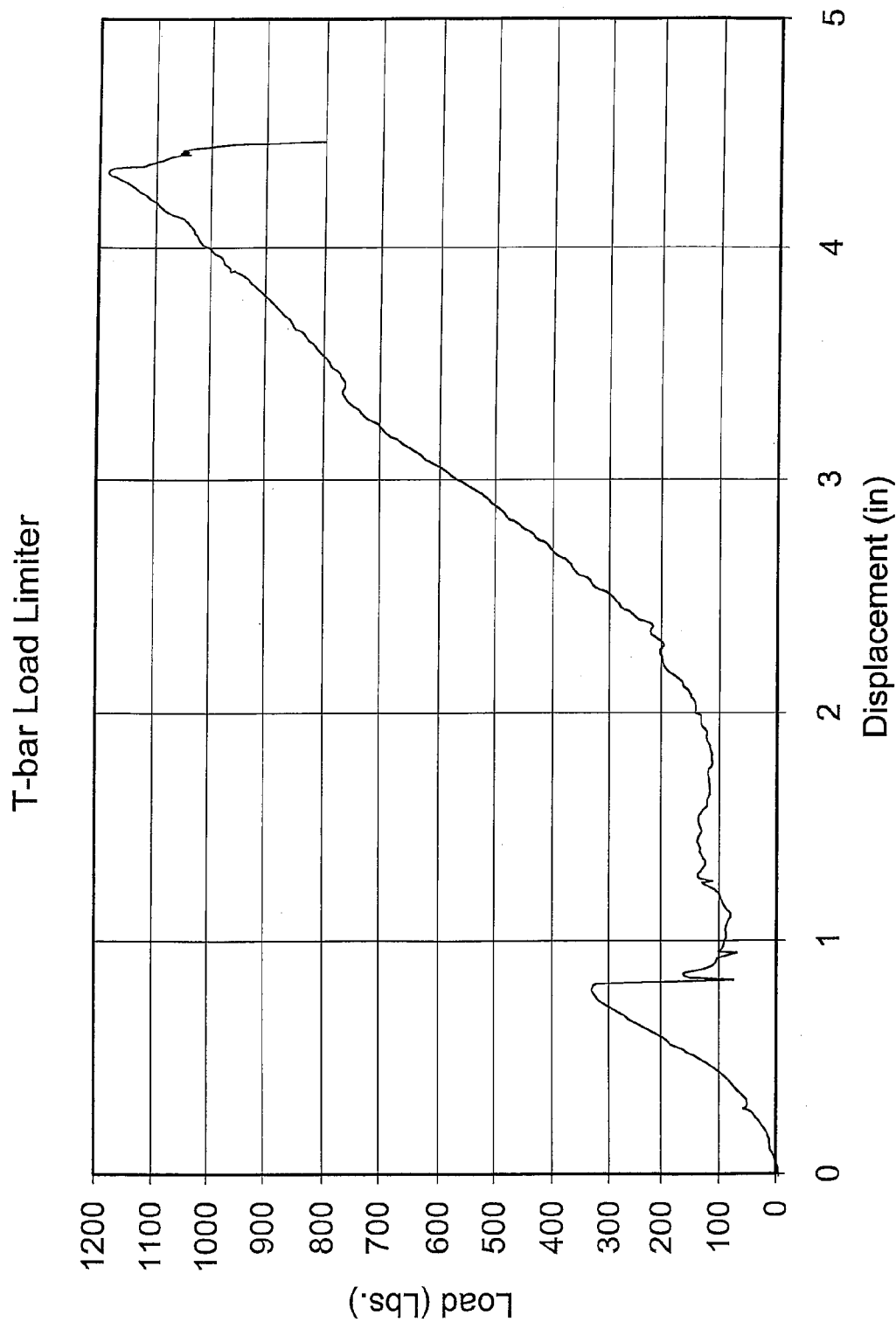
FIG. 13 is a diagram of the load characteristics of the illustrative device of FIG. 10.

In operation, the load control device 110, whether or not it comprises none, one or more than one mounting member(s) 74, 75, and whether or not the mounting member(s) 74, 75 comprise(s) one or more anchor slot(s) 82, 83, operates generally as follows. One or more restraint members or belts 36, 37 of any suitable add-on child restraint system's, such as a portable child seat, restraint harness is/are coupled or mounted to the mounting member(s) 74, 75 by being threaded through or being received by the anchor slot(s) 82, 83 in any conventional manner and the load limiting member 76 is coupled to the illustrative restraint harness by another restraint member 38 being threaded through, coupled or received by anchor slot 92. In the alternative, the load limiting member 76, as noted above, could also receive one or more additional restraint members 36, 37 in its load limiting channel or slot 96. One or more of the restraint members 36, 37, 38 could be coupled to the child seat, which in turn may be mounted to a vehicle. Thus, those skilled in the art will see that load control device 110, and load control devices 210, 210' described herein below, could replace the conventional T-Bar or splitter plates used on restraint harnesses, for example three-point and five-point restraint harnesses or systems, carried by child seats. An example of such a splitter plate is described in commonly owned U.S. Design Patent No. Des 285,383. The restraint harness of the child seat is engaged about an occupant of the child seat as known to those skilled in the art. Under normal operating conditions, the restraint harness restrains the occupant and the coupler(s) or fastener(s) 79 load are generally fixed from linear movement within the load limiting channel, thereby fixing the mounting member(s) 74, 75 and load the limiting member 76 from movement relative to one another. In the event of a dynamic event as previously described, such as a rapid deceleration of sufficient amount, force or load, the occupant is thrown or urged against the restraint harness, which in turn elongates under the initial load, as shown up to the initial spike in FIG. 13, which in turn applies a force or load to the mounting member(s) 83, 84 in a direction opposite arrow 95, while an opposite force or load is applied in the direction of arrow 95 against the load limiting member 76. Thereafter, the load limiting member or frame 76 yields. More specifically, the load limiting channel 97 yields, and is plastically deformed, thereby allowing the coupler(s) or fastener(s) 79 to travel linearly within the channel or slot 97. When sufficient load is applied, the fastener(s) or coupler(s) move linearly away from the proximate end 99, opposite the direction of arrow 95, as illustrated in FIG. 13 in the increasing load vs. displacement from about 1 inch to just over 4 inches. This deformation and linear travel within the load limiting channel 97 helps to dissipate energy and control, limit, lessen, or reduce the force of the deceleration or the load applied to or experienced by the occupant of the child seat as described herein. Such an abnormal indication or dynamic event, for example, may be when the vehicle hits another object, or is hit by another object, or is suddenly braked. It will be appreciated that the device 110 may be inverted such that the load limiting member 76 is oriented as an upright rather than an inverted "T". It will also be appreciated that the load control device 110 could be mounted directly to the child seat rather than merely coupled to the child seat through the restraint harness carried by or mounted to the child seat.

Figure 14:
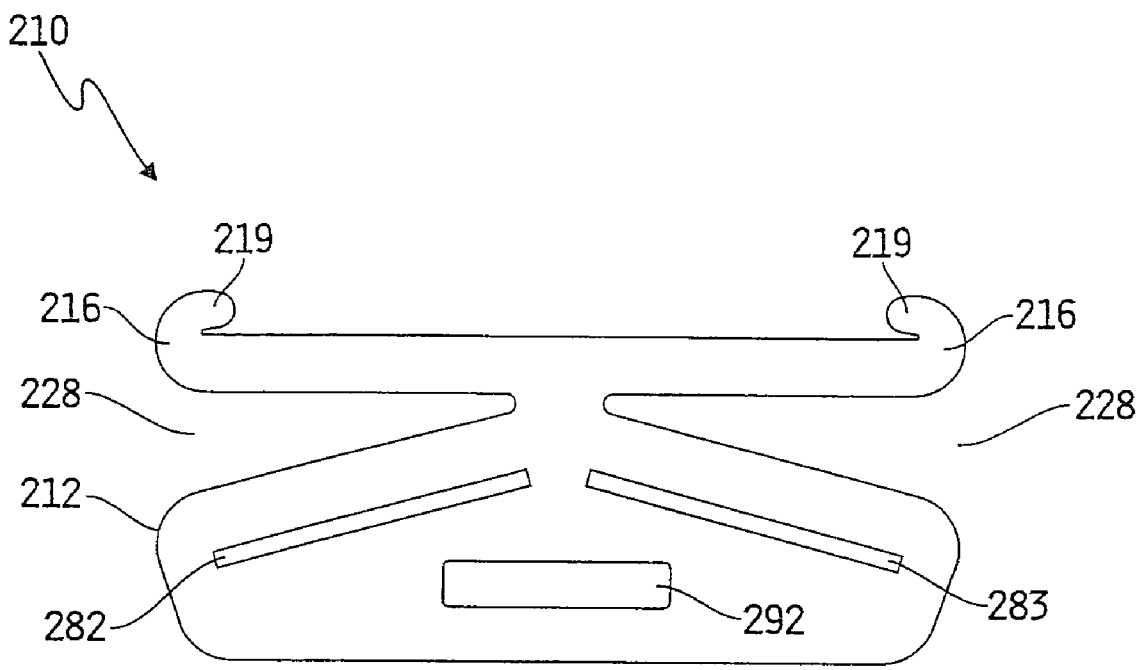
FIG. 14 illustrates another load control device.
Figure 15:
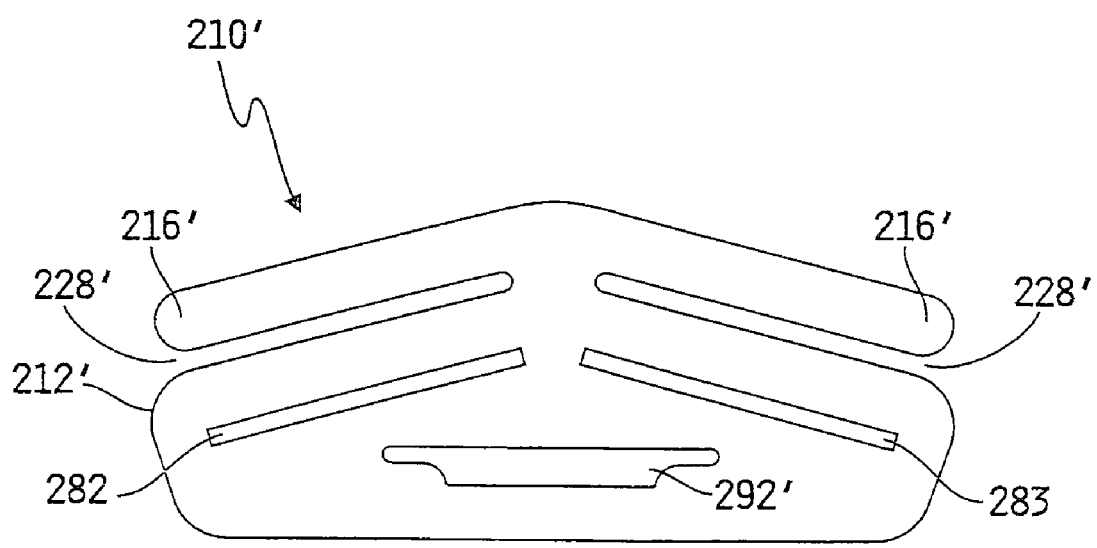
FIG. 15 illustrates another load control device.

Referring now to FIGS. 14 and 15 further illustrative embodiments of load control devices 210, 210' are depicted. As in the case of load control device 110, load control devices 210, 210' may replace a conventional splitter plate, while allowing the load or force applied to an occupant of a child seat to be controlled, limited or reduced. Load control devices 210, 210' comprise a frame 212, 212' defining or forming therein at least one restraint member anchor slot. Illustratively, anchor slots 282, 283, 292 are defined. In addition, a load limiting extension or member 216, 216' is formed on the frame 212, 212'. The load limiting extension or member 216, 216' illustratively is an elongated member, such as for example and without limitation an elongated bar. A space or void 228, 228' is formed between the load limiting member and the rest of the frame 212, 212' to allow for the deformation of the member 216, 216'. As in the case of load control device 210, the load limiting member 216 may have turned up ends 219. The load limiting extension may be coupled to the frame 212, 212' or may be an integral part thereof such that the frame 212, 212' includes the load limiting extension or member in a monolithic construction.

In an illustrative add-on child restraint system having a restraint harness including for example shoulder restraint members 36, 37 and crotch restraint members 38, the shoulder restraint members 36, 37 would be coupled to, threaded through or received by anchor slots 282, 283 and a crotch restraint member 38 would be coupled to, threaded through or received by anchor slot 292. Illustratively, restraint members 36, 37 would be threaded through corresponding anchor slots 282, 283 and then wrapped or looped around the corresponding ends of the load limiting member 216, 216'. For example and without limitation, the restraint members 36, 37 could be of loop construction, such that the loops are received by and threaded through the anchor slots 282, 283 and then the loops passed over the ends of the load limiting member 216, 216'. The turned up ends 219 may aid in the placement and retention of the restraint members. It will be appreciated that anchor slots 282, 283 could be replaced by a single anchor slot.

In operation, the load control device is integrated into a restraint harness of an add-on child restraint system such as a portable child seat as described above. An occupant of the child seat is secured by the restraint harness. Under a sufficient load, such as from a dynamic event, as for example and without limitation described herein above, at least a portion of the frame 212, 212', for example the load limiting member 216, 216', will yield or deform to control or absorb the energy, force, or load directed, applied or distributed onto an occupant of a child seat. The load limiting member 216, 216' may deform toward or away from the rest of the frame 212, 212' depending on how the restraint members are looped around the load limiting member 216, 216' and how the load control device 210, 210' is integrated or coupled to the restraint harness.

As noted above with respect to devices 10, 10', the components of the various embodiments of the load control device 110, 210, 210' may be fashioned out of any suitable metallic, non-metallic, or composite material or any combination thereof and by any method of manufacture suitable to the material used. So too, each of the load control devices can be manufactured to yield or deform a predetermined amount and under a predetermined load and to control, dissipate, absorb or distribute a certain amount of load. For example and without limitation, the amount and type of restraint member 17, 17' threaded into load control device 10, 10', along with the deformation characteristics of the load control member 14, may determine when deformation occurs, how much deformation occurs and how much energy is directed or applied to an occupant. The length and deformation characteristics of the load limiting channel 96 of load control device 110 may similarly determine when deformation occurs, how much deformation occurs and how much energy is directed or applied to an occupant. So too, if the load control device 210, 210' is configured such the load limiting member 216, 216' will deform toward the frame, then the size of void 228, 228', along with the deformation characteristics of the load limiting member 216, 216' and the characteristics of the restraint members, will influence when deformation occurs, how much deformation occurs and how much energy is directed or applied to an occupant.

Figure 16:
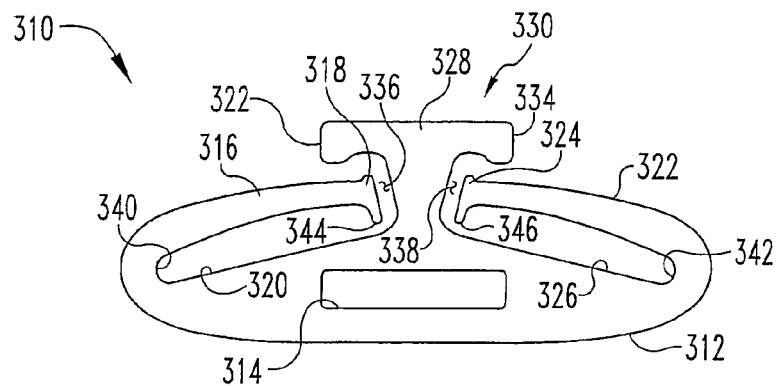
FIG. 16 illustrates another load control device.
Figure 17:
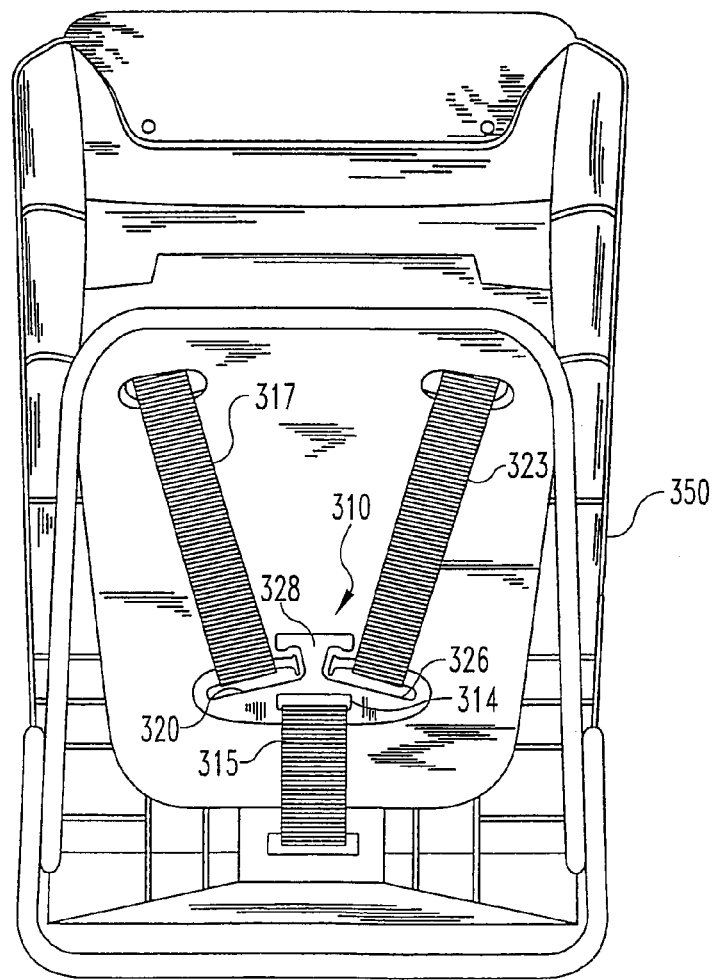
FIG. 17 is a side elevation view of the load control device of FIG. 16, showing the load control device used in a restraint harness for a child safety seat, interconnecting three restraint webs.
Figure 18:
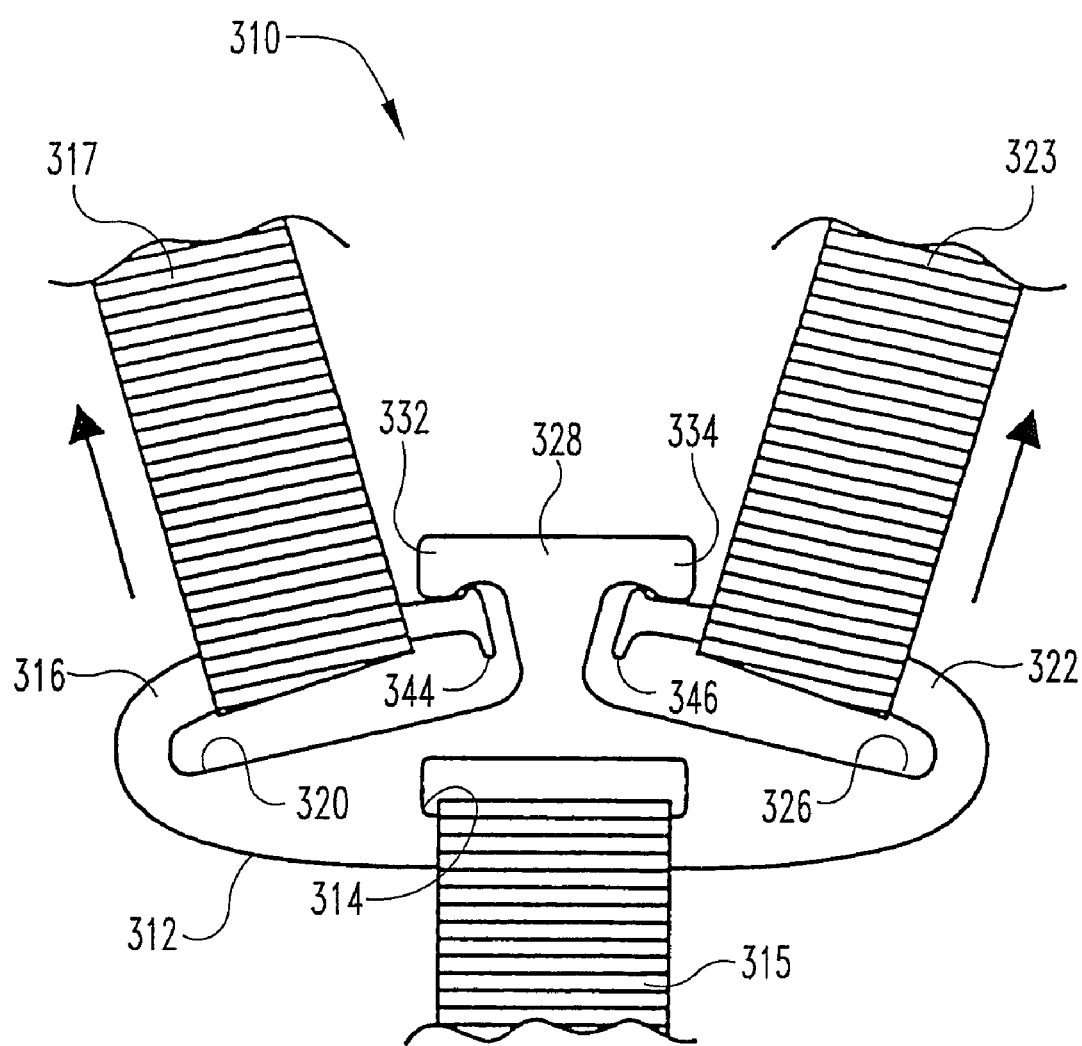
FIG. 18 is a side elevation view of the load control device of FIGS. 16 and 17, with portions broken away, illustrating the response of the load control device under the force of at least two of the webs.

Referring now to FIGS. 16-18, another illustrative embodiment of a load control device 310 is shown. In the illustrated embodiment, the load control device 310 includes a body member 312 defining an aperture 314 configured to receive a first web 315 therethrough. The first web 315 is secured to the body member 312 in a conventional manner via the aperture 314. The body member 312 includes a first web retainer arm 316 extending from the body member 312 and terminating at a first free end 318. The first retainer arm 316 and the body member 312 form a first channel 320 therebetween. The first channel 320 is configured to receive and engage a second web 317. The body member 312 further includes a second web retainer arm 322 extending from the body member 312 and terminating at a second free end 324. The second retainer arm 322 and the body member 312 form a second channel 326 therebetween. The second channel 326 is configured to receive and engage a third web 323. In a typical arrangement, as illustrated in FIG. 17, the first web 315 may be a fixed or anchor web, or alternatively a crotch web, and the second and third webs 317 and 323 may be shoulder or torso webs, all forming part of a conventional portable child seat 350.

A limit member 328 extends from the body member 312 and is configured to limit travel of the first and second web retainer arms 316, 322 in a direction away from the body member 312 resulting from forces applied to the first and second web retainer arms 316, 322 by the second and third webs 317, 323, respectively, as illustrated by the directional arrows in FIG. 18. The limit member 328 includes a distal end 330 having a first stop member 332 extending from one side thereof, and a second stop member 334 extending from an opposite side thereof. The first and second free ends 318, 324 of the first and second web retaining arms 316, 322 are normally positioned between the body member 312 and the distal end 330 of the limit member 328 as illustrated in FIG. 16. The first web retainer arm 316 is configured to yield and move in a direction away from the body member 312 and toward the first stop member 332 under a load established between the aperture or anchor slot 314 and the aperture or anchor slot 320 that is in excess of a predetermined load. Likewise, the second web retainer arm 322 is configured to yield and move in a direction away from the body member 312 and toward the second stop member 334 under a load established between the aperture or anchor slot 314 and the aperture or anchor slot 326 that is in excess of the same predetermined load. The distal end 330 of the limit member 328 is configured so that the first and second stop members 332, 334 come into contact with the first and second free ends 318, 324 of the first and second web retainer arms 316, 322, respectively, to limit travel of the first and second web retainer arms 316, 322 as they travel away from the body member 312 as illustrated in FIG. 18. In the illustrated embodiment, the body member 312, first and second retainer arms 316, 322, and limit member 328 are of uniform construction and together form a planar structure.

The limit member 328 and the first free end 318 of the first web retainer arm 316 define therebetween a web access opening 336 to the first channel 320. Likewise, the limit member 328 and the second free end 324 of the second web retainer arm 322 define therebetween a web access opening 338 to the second channel 326. The first free end 318 of the first web retainer arm 316 defines a protrusion 344 extending into the first channel 320, which is configured to facilitate retention of the second web 317 in the first channel 320 when received therein as illustrated in FIG. 17. Likewise, the second free end 324 of the second web retainer arm 322 defines a protrusion 346 extending into the second channel 326, which is configured to facilitate retention of the third web 323 within the second channel 326 when received therein.

In the illustrated embodiment, the first and second channels 320, 326 are configured to slope downwardly away from the web access openings 336, 338 to a first channel terminal end 340 and a second channel terminal end 342, respectively. This sloping configuration of the first and second channels 320, 326 facilitates retention of the webs 317 and 323 within the first and second channels 320 and 326 respectively by naturally directing the web 317 toward the first channel terminal end 340 and naturally directing the web 323 toward the second channel terminal end 342.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A load control device for a restraint harness having at least first, second, and third webs, the load control device comprising:
    a body member defining an aperture configured to receive the first web therethrough,
    a first web retainer arm extending from the body member and terminating at a first free end, the first web retainer arm and the body member forming a first channel therebetween configured to receive the second web,
    a second web retainer arm extending from the body member and terminating at a second free end, the second web retainer arm and the body member forming a second channel therebetween configured to receive the third web, and
    a limit member extending from the body member and configured to limit travel of the first and second web retainer arms in a direction away from the body member resulting from forces applied to the first and second web retainer arms by the second and third webs respectively.

2. The load control device of claim 1 wherein the limit member terminates at a distal end with the first and second free ends normally positioned between the body member and the distal end, the distal end of the limit member configured to come into contact with the first and second free ends to thereby limit travel of the first and second web retainer arms as they travel away from the body member.

3. The load control device of claim 2 wherein the distal end of the limit member defines a first stop member extending away from the distal end with the first free end of the first web retainer arm positioned between the body member and the first stop member.

4. The load control device of claim 3 wherein the distal end of the limit member defines a second stop member extending away from the distal end with the second free end of the second web retainer arm positioned between the body member and the second stop member.

5. The load control device of claim 1 wherein the limit member and the first free end of the first web retainer arm define therebetween a web access opening to the first channel.

6. The load control device of claim 5 wherein the first channel slopes away from the web access opening to the first channel to a terminal end of the first channel.

7. The load control device of claim 6 wherein the limit member and the second free end of the second web retainer arm define therebetween a web access opening to the second channel.

8. The load control device of claim 7 wherein the second channel slopes away from the web access opening to the second channel to a terminal end of the second channel.

9. The load control device of claim 5 wherein the first free end of the first web retainer arm defines a protrusion extending into the first channel and configured to facilitate retention of the second web within the first channel.

10. The load control device of claim 9 wherein the second free end of the second web retainer arm defines a protrusion extending into the second channel and configured to facilitate retention of the third web within the second channel.

11. The load control device of claim 1 wherein the body member, the first web retainer arm, second retainer arm, and limit member are of uniform construction.

12. The load control device of claim 11 wherein the body member, first web retainer arm, second retainer arm, and limit member together form a planar structure.

13. A load control device for a child restraint harness having a first shoulder web, a second shoulder web, and a third web comprising:

a frame with a pair of arms mounted thereto each with a free end with said arms forming a first slot and a second slot that are spaced apart to receive respectively a first shoulder web and a second shoulder web of a child restraint harness, said frame including an aperture to receive a third web of a child restraint harness, said frame further including a load limiting member positioned apart from said free end of each of said cantilevered arms limiting bending of said arms against said load limiting member when load is applied to said first shoulder web, said second shoulder web and said third web.

14. The device of claim 13 wherein said arms have proximal end portions cantilevered to said frame with said free ends spaced apart from said load limiting member allowing said first shoulder web and said second shoulder web to be slipped therebetween for mounting to said frame.

15. The device of claim 14 wherein said load limiting member is T shaped forming a pair of outwardly extending fingers that project outwardly of said arms limiting outwardly movement of said arms when load is applied to said first shoulder web and said second shoulder web.

\* \* \* \* \*